United States Patent
Hu et al.

(10) Patent No.: US 10,362,044 B2
(45) Date of Patent: Jul. 23, 2019

(54) IDENTIFYING COMMAND AND CONTROL ENDPOINT USED BY DOMAIN GENERATION ALGORITHM (DGA) MALWARE

(71) Applicant: International Business Machines Corporation, Armonk, NY (US)

(72) Inventors: Xin Hu, White Plains, NY (US); Jiyong Jang, White Plains, NY (US); Douglas Lee Schales, Ardsley, NY (US); Marc Philippe Stoecklin, White Plains, NY (US); Ting Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 15/671,218

(22) Filed: Aug. 8, 2017

(65) Prior Publication Data

US 2019/0052650 A1    Feb. 14, 2019

(51) Int. Cl.
| | |
|---|---|
| *H04L 29/06* | (2006.01) |
| *G06F 21/56* | (2013.01) |
| *G06F 21/55* | (2013.01) |
| *G06F 21/57* | (2013.01) |

(52) U.S. Cl.
CPC ......... *H04L 63/1408* (2013.01); *G06F 21/55* (2013.01); *G06F 21/552* (2013.01); *G06F 21/566* (2013.01); *H04L 63/1425* (2013.01); *H04L 63/1433* (2013.01); *G06F 21/577* (2013.01); *H04L 63/145* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 8,813,228 B2 | 8/2014 | Magee et al. | |
| 9,166,994 B2 | 10/2015 | Ward et al. | |
| 9,245,121 B1* | 1/2016 | Luo | H04L 63/1408 |
| 9,479,524 B1* | 10/2016 | Hagen | H04L 63/1425 |
| 10,178,107 B2* | 1/2019 | Havelka | H04L 63/1441 |
| 2002/0087722 A1* | 7/2002 | Datta | H04L 29/12066 |
| | | | 709/239 |
| 2003/0172163 A1* | 9/2003 | Fujita | H04L 67/1008 |
| | | | 709/226 |

(Continued)

*Primary Examiner* — Ali Shayanfar
(74) *Attorney, Agent, or Firm* — Jeffrey S. LaBaw; David H. Judson

(57) ABSTRACT

A command endpoint used by Domain Generation Algorithm (DGA) malware is identified using machine learning-based clustering. According to this technique, at least one attribute associated with a candidate resolved DNS name is identified. The candidate resolved DNS name has associated therewith a set of names that are failed DNS lookups but that cluster with the candidate resolved DNS name. A set of additional names that share the at least one attribute with the candidate resolved DNS name are then identified. For the set of additional names, an extent to which the set of additional names also clusters with the set of names that are failed DNS lookups is then determined. The candidate resolved DNS name is characterized as associated with the command endpoint when the set of additional names cluster with the set of names that are failed DNS lookups to a configurable degree.

21 Claims, 4 Drawing Sheets

(56) References Cited

U.S. PATENT DOCUMENTS

| | | |
|---|---|---|
| 2013/0191915 A1 | 7/2013 | Antonakakis et al. |
| 2014/0090058 A1 | 3/2014 | Ward et al. |
| 2015/0264070 A1* | 9/2015 | Harlacher ............ H04L 63/1441 726/23 |
| 2017/0041333 A1* | 2/2017 | Mahjoub .............. H04L 61/1511 |
| 2017/0111851 A1* | 4/2017 | Zhang ................. H04L 61/2007 |
| 2017/0180312 A1* | 6/2017 | Sullivan .............. H04L 61/3025 |
| 2017/0316342 A1* | 11/2017 | Franc ...................... G06F 17/11 |
| 2018/0004941 A1* | 1/2018 | Reinecke ................. G06F 21/55 |

* cited by examiner

IDENTIFYING COMMAND AND CONTROL ENDPOINT USED BY DOMAIN GENERATION ALGORITHM (DGA) MALWARE

BACKGROUND

Technical Field

This disclosure relates generally to cybersecurity.

Background of the Related Art

Today's networks are larger and more complex than ever before, and protecting them against malicious activity is a never-ending task. New technology, configuration changes, software upgrades and routine maintenance, among other items, can create new and unknown security exposures. Moreover, computer "hackers" and other third parties continue to employ increasingly sophisticated techniques and tools, resulting in ever-growing challenges to network and computer system security. When a computer becomes infected, e.g., with ransomware, the malware typically generates a very small amount of external network traffic. In particular, upon infection, most versions or variants of ransomware utilize a pseudo-random Domain Generation Algorithm (DGA) to randomize the Domain Name Service (DNS) requests that it makes to a Command and Control (CnC) server. This makes blacklisting the known domains much harder, because the malware uses the DGA to generate thousands of randomized domain names, where one may be a legitimate domain used to connect to the CnC server. Typically, this initial contact with the CnC server is to enroll the computer with the CnC server and to obtain the public encryption key(s) it then uses to encrypt all the user's files. Therefore, a memory dump or network traffic capture does very little to help gain the necessary information to restore the files, because the private key that is needed to decrypt the files never exists on the victim computer.

The owner of the malware, however, knowing the pseudo-random algorithm, is able to selectively enable some of these names generated by its DGA so that they resolve to Internet Protocol (IP) addresses, thereby allowing the malware to communicate with the owner's CnC endpoint device.

Existing work to address this security problem has focused on either detecting the existence of DGA malware by analyzing DNS data, or by reverse engineering the malware code to determine the pseudo-random algorithm. These approaches work generally well, but they are computationally-intensive, are not zero-knowledge based, and/or limited in the types of CnC names that they can detect.

There remains a need in the art to provide enhanced techniques to identify command and control endpoints used by DGA-based malware.

BRIEF SUMMARY

A command endpoint used by Domain Generation Algorithm (DGA) malware is identified using machine learning-based clustering.

According to one embodiment, a method to identify the command endpoint begins by identifying at least one attribute associated with a candidate resolved DNS name. The attribute associated with the candidate resolved DNS name may be one of: IP address, name server record data (e.g., from WHOIS or other name registry data), the identity of one or more client that issue a DNS query to the name, combinations thereof, or the like. The candidate resolved DNS name has associated therewith a set of names that are failed DNS lookups and that cluster with the candidate resolved DNS name according to a machine learning clustering technique. A set of additional names that share the at least one attribute with the candidate resolved DNS name are then identified. For the set of additional names, an extent to which the set (of additional names) also clusters with the set of names that are failed DNS lookups is then determined. The candidate resolved DNS name is characterized as associated with the command endpoint when the set of additional names cluster with the set of names that are failed DNS lookups to a configurable degree.

According to a second aspect of this disclosure, an apparatus to identify a command endpoint used by DGA malware is described. The apparatus comprises a set of one or more hardware processors, and computer memory holding computer program instructions executed by the hardware processors to perform a set of operations such as described above.

According to a third aspect of this disclosure, a computer program product in a non-transitory computer readable medium for use in a data processing system to identify a command endpoint used by DGA malware is described. The computer program product holds computer program instructions executed in the data processing system and operative to perform operations such as described above.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

As will be described below, the techniques herein utilize machine learning to identify command and control endpoint(s) used by DGA malware. Typically, machine learning algorithms and associated mechanisms execute as software, e.g., one or more computer programs, executing in one or more computing machines. As background, the following describes representative computing machines that may be utilized for executing the learning process.

Figure 1:
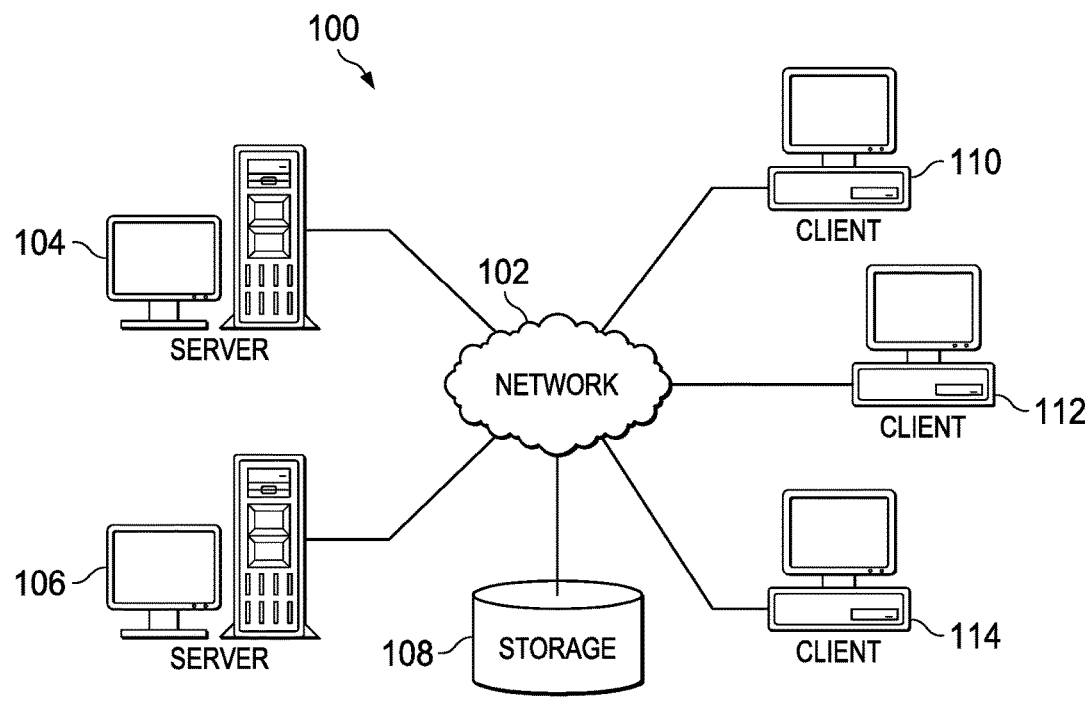
FIG. 1 depicts an exemplary block diagram of a distributed data processing environment in which exemplary aspects of the illustrative embodiments may be implemented.
Figure 2:
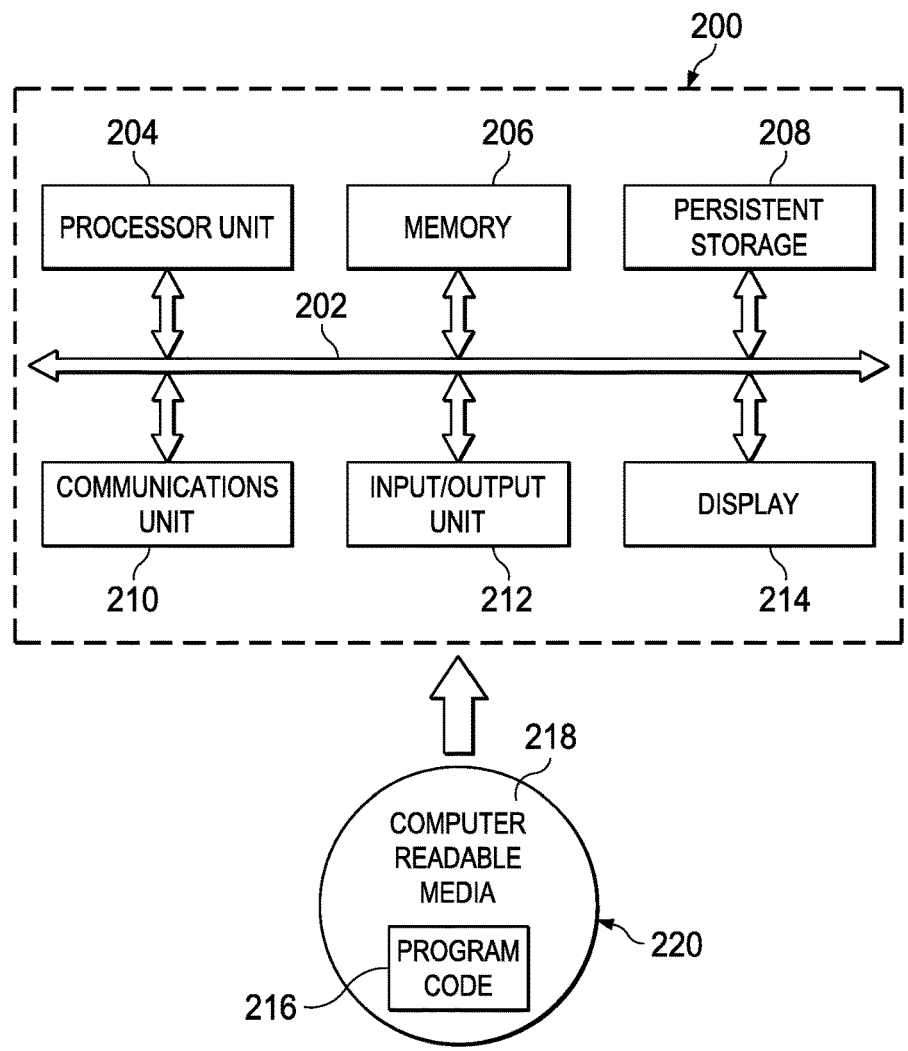
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Computing machines such as described above may provide for machine learning. As is well-known, machine learning involves using analytic models and algorithms that iteratively learn from data, thus allowing computers to find insights in the data without being explicitly programmed where to look. Machine learning may be supervised or unsupervised. Supervised machine learning involves using training examples by which the machine can learn how to perform a given task. Unsupervised machine learning, in contrast, involves providing unlabeled data objects, which the machine then processes to determine an organization of the data. One well-known type of unsupervised machine learning is clustering, which refers to the notion of assigning a set of observations into subsets, which are referred to as "clusters," such that observations within a cluster have a degree of similarity. A common approach to clustering is k-means clustering, which is an algorithm that classifies or groups objects based on attributes or features into k number of group, typically by minimizing a sum of squares of distances between data and a centroid of a corresponding cluster. Unsupervised machine learning via clustering provides a way to classify the data. Other clustering algorithms are well-known.

Domain Name Services

By way of additional background, the Domain Name System (DNS) is a hierarchical decentralized naming system for computers, services, or other resources connected to the Internet or a private network. It associates various information with domain names assigned to each of the participating entities. In particular, it translates more readily memorized domain names to the numerical IP addresses needed for the purpose of locating and identifying computer services and devices with the underlying network protocols.

Figure 3:
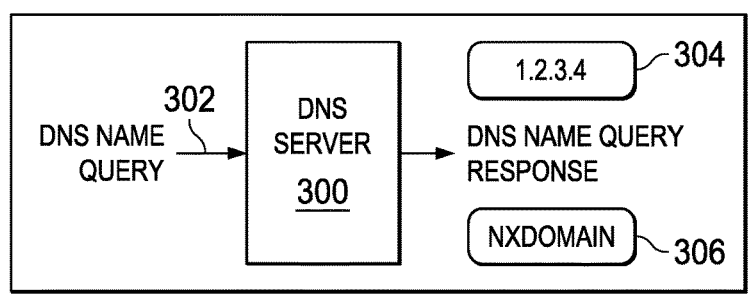
FIG. 3 illustrates a Domain Name System (DNS) server that provides name services in a computing environment such as the environment in FIG. 1.

As is well-known, and with reference to FIG. 3, DNS server 300 is a computer-implemented process or program used to translate a domain name (or "hostname" or "host")

302 into a response that is typically an Internet Protocol (IP) address 304. An NXDOMAIN (or Non-Existent Domain) 306 is a term used for an Internet domain name that is unable to be resolved using the DNS server 300 (or for a domain name not yet registered). A failed DNS lookup results in an NXDOMAIN (or, as sometimes used herein, an NXNAME).

When a domain name is resolvable by the DNS server, it is sometimes referred to herein as a "resolved DNS name."

When a domain name is not resolvable by the DNS server, e.g., because the DNS cannot resolve it into an IP address, it is sometimes referred to as a failed DNS lookup.

Advanced Persistent Threat (APT) Prevention Solutions

APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

Figure 4:
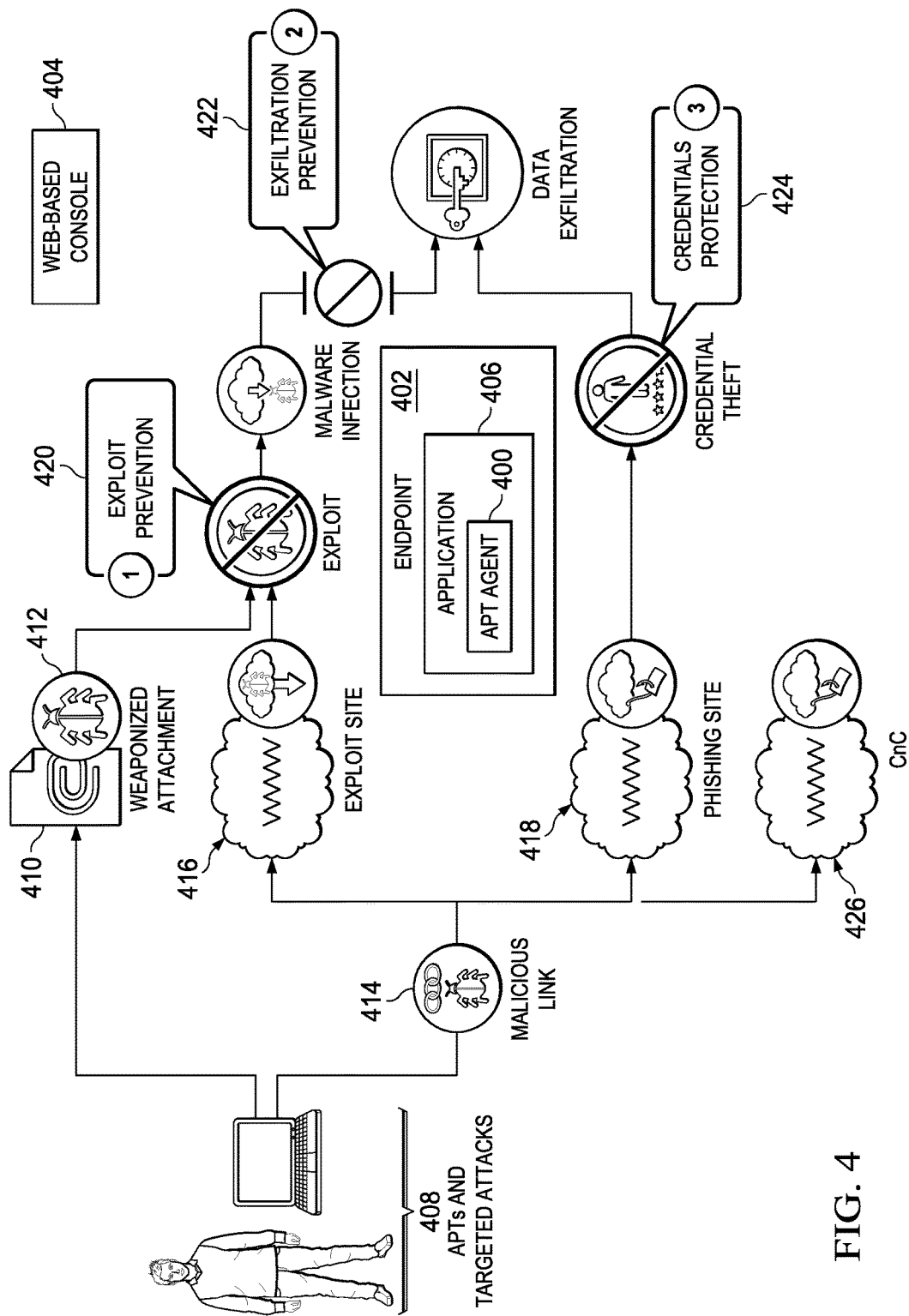
FIG. 4 depicts an Advanced Persistent Threat (APT) platform in which the techniques of this disclosure may be practiced.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability.

FIG. 4 depicts how APT attacks typically unfold and the points at which the APT solution is operative to stop the intrusion. For example, here the attacker 408 uses a spear-phishing email 410 to send an employee a weaponized document, one that contains hidden exploit code 412. When the user opens the document with a viewer, such as Adobe Acrobat or Word, the exploit code runs and attaches to an application vulnerability to silently download malware on the employee computer 402. The employee is never aware of this download. Another option is to send a user a link 414 to a malicious site. It can be a malicious website 416 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 418 to convince the user to submit corporate credentials. After infecting the computer 402 with advanced malware or compromising corporate credentials, attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent performs these and related operations by monitoring the application and its operations using a whitelist of legitimate application states.

By way of additional background, information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 400 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Further, the reference to an "agent" is not intended to be limiting. The "agent" may be any code-based module, program, process, component, thread or the like.

According to this disclosure, the malware 412 includes DGA code, and the APT solution includes additional or extended functionality to enable the platform to determine a command and control endpoint 426 used by the DGA malware. This functionality is now described.

Identifying Command and Control (CnC) Endpoint Used By DGA Malware

With the above as background, the techniques of this disclosure are now described.

Figure 5:
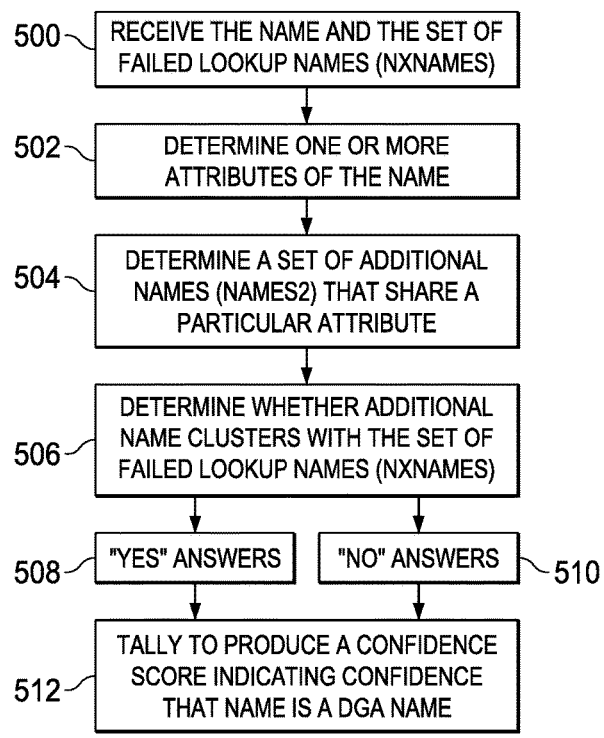
FIG. 5 depicts a high level process flow of the machine learning-based clustering technique of this disclosure to determine whether a particular candidate domain name should be deemed to point to a command and control endpoint.

Preferably, the approach herein uses machine learning-based clustering to determine whether a candidate domain name is a DGA name (or, more generally, an algorithm-generated domain) that resolves to a Command and Control (CnC) endpoint (or "command endpoint") used by DGA malware. FIG. 5 depicts a process flow of the basic method.

The candidate domain name (or "NAME") is one that does resolve through DNS, and it has associated therewith a set of failed lookup names (NXDOMAINS, or NXNAMES), with which NAME clusters. In particular, and as depicted in FIG. 5, the input to the technique is a candidate resolved DNS name (NAME) together with a set of failed lookup names (NXNAMES) that cluster with NAME. Thus, as step 500, the NAME and the set of failed lookup names (NXNAMES) are received or ascertained. Given this input, one or more attributes of the candidate NAME are determined or ascertained. This is step 502. The one or more attributes may be of various types, such as: an IP address to which the NAME resolves (via DNS), information associated with the NAME, e.g., as determined from name server data records (WHOIS queries and the like), the identity of one or more clients (by IP address or otherwise) that queried DNS for resolution of the NAME, combinations thereof, and the like. Based on the one or more attributes, and at step 504, a set of additional names (NAMES2) are determined. Preferably, the set of additional names are those that share the one or more attributes that have been determined or identified. Once the set of additional names are determined, the method continues at step 506. A determination is made for each additional name in the set and, in particular, whether the additional name (NAMES2$_i$) also (like NAME) clusters with the failed lookup names NXNAMES. For each NAMES2$_i$ that clusters with the set of failed lookup names, a "yes" vote (or, more generally, a first determination) is generated, as indicated at step 508; conversely, for each NAMES2$_i$ that does not cluster with the set of failed lookup names, a "no" vote (or, more generally, a second determination) is generated, as indicated at step 510. At step 512, the "yes" and "no" votes for the set of additional names are then tallied to produce a confidence score (e.g., with a value between 0 and 1) that indicates a confidence whether the NAME should be considered likely to have been algorithmically-generated. This completes the basic method. Based on the confidence determination, an appropriate mitigation action (e.g., domain blocking, issuing a notification, or the like) may then be implemented with respect to the NAME.

Thus, according to the approach herein, a NAME is evaluated to identify whether it points (resolves) to a likely CnC endpoint device by using at least one attribute associated with the NAME to determine whether a set of additional names (NAMES2) that share the at least one attribute clusters to a set of failed lookups to the same or similar extent as does the NAME. When the set of additional names that share the at least one attribute cluster sufficiently, the NAME is characterized as likely to be associated with an CnC endpoint such that appropriate mitigation, notification or other response can then be taken by an APT platform. The nature of the mitigation, notification or other responsive action is not an aspect of this disclosure directly, as such techniques, devices and methods are well-known in the art.

Figure 6:
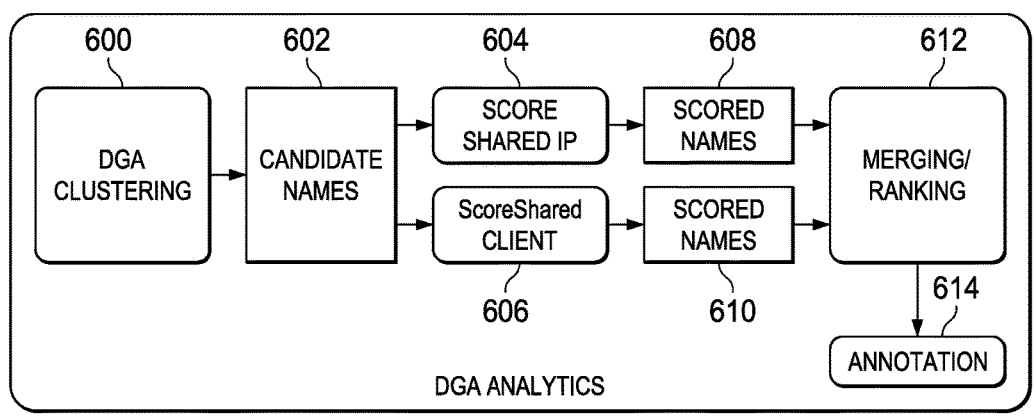
FIG. 6 depicts an alternative embodiment of this disclosure wherein multiple attribute types are used to generate confidence scores for the endpoint identification technique.

While the above-described method refers to at least one attribute of the NAME, one of ordinary skill will appreciate that the same approach can be repeated for multiple different attribute types, with the confidence scores so generated (for each attribute type) aggregated or otherwise combined to create an ensemble score. Such an approach is depicted in FIG. 6. In this example embodiment, once again it is assumed that there is a candidate resolved DNS name. The DGA clustering technique begins at step 600 with the receipt of one or more candidate resolved DNS names 602. In this example, and for each candidate resolved DNS name, there are two (2) attribute types used for the analysis, namely IP address, and requesting client identity. Thus, and in the manner described above with respect to FIG. 5, the method is carried out to score the shared IP address comparisons. This is step 604. Likewise, and once again as described with respect to FIG. 5, the method is carried out to score the shared client identity comparisons. This is step 606. Steps 604 and 606 (each of which correspond to the technique in FIG. 5) may be carried out concurrently (in parallel), or sequentially. The scoring in step 604 produces scored names 608, while the scoring in step 606 produces scored names 610. At step 612, the scores 608 and 610 are merged and ranked, with the result then generated at step 616. In this example, the result is an annotation that is then applied to the NAME. In this manner, multiple different attribute types are processed (concurrently or sequentially) and the confidence scores from each are both used to create an ensemble score (step 612) that determines whether the NAME likely points to the CnC endpoint. The process shown in FIG. 6 can be repeated for additional candidate resolved DNS name(s).

The particular clustering method used by the machine learning is not a limitation in this disclosure, although typical techniques include centroid-based clustering (e.g., k-means clustering), connectivity-based clustering (e.g., hierarchical clustering based on distance connectivity), distribution-based clustering (using statistical distributions, such as multivariate normal distributions used by expectation-maximization algorithm), density-based clustering (that shown connected dense regions in the relevant data space), graph-based clustering, and the like.

Typically, the operations described are carried out autonomously as unsupervised machine learning, and one or more of the functions may be carried out across multiple computers or machines.

The candidate resolved DNS name (NAME) may be provided from any DNS server, such as the DNS server shown in FIG. 3.

The techniques herein may leverage one or more machine learning clustering techniques for each of the evaluations.

Preferably, the same clustering technique used to identify whether the candidate resolved DNS name (NAME) clusters with the set of failed DNS lookups (NXNAMES) is used to determine whether the NAMES, name clusters with NXNAMES, although this is not a requirement. Thus, in an alternative embodiment, the clustering techniques for each of these clusters may be different.

It may also be desirable to execute the clustering technique shown in FIG. 5 for a particular attribute over multiple iterations using different clustering techniques, and then averaging the results before making a determination regarding whether the name points to a suspected CnC endpoint.

The disclosed subject matter provides significant advantages. The approach is zero knowledge-based, in that it does not require information about past threats. It also does not require categorization mechanisms, e.g., to determine whether a domain name matches domain names known to be suspicious or otherwise previously classified. Rather, the approach operates in an entirely unsupervised manner, taking in a candidate resolved DNS name and the failed DNS lookups that cluster therewith, and then making a determination whether the candidate name points to a command endpoint. The approach is computationally efficient in that the set of additional names are readily generated and easily tested (for their association with the failed DNS lookups) in order to generate the prediction. In this manner, command endpoints are more-readily identified such that appropriate corrective actions can be taken with respect to the malware owner. The technique may leverage one or more machine learning clustering techniques for each of the evaluations. The approach extends known DNS analysis-based DGA detection by cleverly leveraging machine learning techniques, thereby allowing the IP addresses of the CnC endpoint(s) to be identified. As noted, with the CnC endpoints are identified, appropriate responsive actions can then be taken by the cybersecurity mechanisms.

More generally, the technique herein also provides for enhanced automated and intelligent investigation of a suspicious network offense so that corrective action may be taken. The nature of the corrective action is not an aspect of the described methodology, and any known or later-developed technologies and systems may be used for this purpose.

The approach herein is designed to be implemented in an automated manner within or in association with a security system, such as an APT platform as depicted in FIG. 4, a STEM device or system, or some other such device. The particular operating platform or computing environment in which the machine learning-based technique is implemented, however, is not a limitation. The machine learning itself can be provided "as-a-service" using a machine learning platform or service.

Alternatively, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the machine learning-based techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, advanced persistent threat (APT) or security incident and event management (STEM) systems, as well as improvements to automation-based cybersecurity-based analytics.

Having described our invention, what we claim is as follows.

The invention claimed is:

1. A method to identify a command endpoint used by Domain Generation Algorithm (DGA) malware, comprising:
   identifying at least one attribute associated with a candidate resolved Domain Name Service (DNS) name, and that has associated therewith a set of names that are failed DNS lookups and that cluster with the candidate resolved DNS name;
   identifying a set of additional names that share the at least one attribute with the candidate resolve DNS name;
   for the set of additional names, determining an extent to which the set of additional names also clusters with the set of names that are failed DNS lookups by computing, for at least one additional name, an aggregate score based on a number of additional names that cluster with the set of names that are failed DNS lookups and determining whether the aggregate score meets or exceeds a configurable degree; and
   characterizing the candidate resolved DNS name as associated with the command endpoint when the set of additional names clusters with the set of names that are failed DNS lookups to the configurable degree.

2. The method as described in claim 1 wherein a clustering technique used to cluster the candidate resolved DNS names with the set of names that are failed DNS lookups is also used to cluster the set of additional names.

3. The method as described in claim 1 wherein determining the extent to which the set of additional names also clusters with the set of names that are failed DNS lookups includes, for each additional name:
   determining whether the additional name clusters with the set of names that are failed DNS lookup;
   for each additional name that clusters with the set of names that are failed DNS lookups, providing a first determination;

for each additional name that does not cluster with the set of names that are failed DNS lookups, providing a second determination.

4. The method as described in claim 3 further including; computing the aggregate score based on a number of first determinations; and determining whether the number of first determinations meets or exceeds the configurable degree.

5. The method as described in claim 1 wherein the at least one attribute is one of:
an IP address, data derived from a name server record associated with the candidate resolved DNS data, an identity of a client that issued a DNS query to the candidate resolved DNS name, and combinations thereof.

6. The method as described in claim 1 further including:
using another attribute associated with the candidate resolved DNS name to identify a second set of additional names;
for the second set of additional names, determining an extent to which the second set of additional names also clusters with the set of names that are failed DNS lookups; and
characterizing the candidate resolved DNS name as associated with the command endpoint when both the set of additional names and the second set of additional names cluster with the set of names that are failed DNS lookups.

7. The method as described in claim 1 wherein a machine learning clustering technique is used to determine the candidate resolved DNS clusters with the set of names that are failed DNS lookups.

8. An apparatus, comprising:
a processor;
computer memory holding computer program instructions executed by the processor, the computer program instructions configured to identify a command endpoint used by Domain Generation Algorithm (DGA) malware, the computer program instructions comprising:
program code to identify at least one attribute associated with a candidate resolved Domain Name Service (DNS) name, and that has associated therewith a set of names that are failed DNS lookups and that cluster with the candidate resolved DNS name;
program code to identify a set of additional names that share the at least one attribute with the candidate resolved DNS name;
program code to determine, for each of the set of additional names, an extent to which the set of additional names also clusters with the set of names that are failed DNS lookups by computing, for at least one additional name, an aggregate score based on a number of additional names that cluster with the set of names that are failed DNS lookups and determining whether the aggregate score meets or exceeds a configurable degree; and
program code to characterize the candidate resolved DNS name as associated with the command endpoint when the set of additional names clusters with the set of names that are failed DNS lookups to the configurable degree.

9. The apparatus as described in claim 8 wherein a clustering technique used to cluster the candidate resolved DNS names with the set of names that are failed DNS lookups is also used to cluster the set of additional names.

10. The apparatus as described in claim 8 wherein the program code to determine the extent to which the set of additional names also clusters with the set of names that are failed DNS lookups includes program code that, for each additional name:
determines whether the additional name clusters with the set of names that are failed DNS lookup;
for each additional name that clusters with the set of names that are failed DNS lookups, provides a first determination;
for each additional name that does not cluster with the set of names that are failed DNS lookups, provides a second determination.

11. The apparatus as described in claim 10 wherein the program code to characterize the candidate resolved DNS name further includes;
program code to compute the aggregate score based on a number of first determinations; and
program code to determine whether the number of first determinations meets or exceeds the configurable degree.

12. The apparatus as described in claim 8 wherein the at least one attribute is one of: an IP address, data derived from a name server record associated with the candidate resolved DNS data, an identity of a client that issued a DNS query to the candidate resolved DNS name, and combinations thereof.

13. The apparatus as described in claim 8 wherein the computer program instructions further include:
program code using another attribute associated with the candidate resolved DNS name to identify a second set of additional names;
program code to determine, for the second set of additional names, an extent to which the second set of additional names also clusters with the set of names that are failed DNS lookups; and
program code to characterize the candidate resolved DNS name as associated with the command endpoint when both the set of additional names and the second set of additional names cluster with the set of names that are failed DNS lookups.

14. The apparatus as described in claim 8 wherein a machine learning clustering technique is used to determine the candidate resolved DNS clusters with the set of names that are failed DNS lookups.

15. A computer program product in a non-transitory computer readable medium for use in a data processing system, the computer program product holding computer program instructions that, when executed by the data processing system, are configured to identify a command endpoint used by Domain Generation Algorithm (DGA) malware, the computer program instructions comprising:
program code to identify at least one attribute associated with a candidate resolved Domain Name Service (DNS) name, and that has associated therewith a set of names that are failed DNS lookups and that cluster with the candidate resolved DNS name;
program code to identify a set of additional names that share the at least one attribute with the candidate resolved DNS name;
program code to determine, for each of the set of additional names, an extent to which the set of additional names also clusters with the set of names that are failed DNS lookups by computing, for at least one additional name, an aggregate score based on a number of additional names that cluster with the set of names that are failed DNS lookups and determining whether the aggregate score meets or exceeds a configurable degree; and program code to characterize the candidate resolved DNS name as associated with the command endpoint when the set of additional names clusters with the set of names that are failed DNS lookups to the configurable degree.

16. The computer program product as described in claim 15 wherein a clustering technique used to cluster the candidate resolved DNS names with the set of names that are failed DNS lookups is also used to cluster the set of additional names.

17. The computer program product as described in claim 15 wherein the program code to determine the extent to which the set of additional names also clusters with the set of names that are failed DNS lookups includes program code that, for each additional name:
- determines whether the additional name clusters with the set of names that are failed DNS lookup;
- for each additional name that clusters with the set of names that are failed DNS lookups, provides a first determination;
- for each additional name that does not cluster with the set of names that are failed DNS lookups, provides a second determination.

18. The computer program product as described in claim 17 wherein the program code to characterize the candidate resolved DNS name further includes;
- program code to compute the aggregate score based on a number of first determinations; and
- program code to determine whether the number of first determinations meets or exceeds the configurable degree.

19. The computer program product as described in claim 15 wherein the at least one attribute is one of: an IP address, data derived from a name server record associated with the candidate resolved DNS data, an identity of a client that issued a DNS query to the candidate resolved DNS name, and combinations thereof.

20. The computer program product as described in claim 15 wherein the computer program instructions further include:
- program code using another attribute associated with the candidate resolved DNS name to identify a second set of additional names;
- program code to determine, for the second set of additional names, an extent to which the second set of additional names also clusters with the set of names that are failed DNS lookups; and
- program code to characterize the candidate resolved DNS name as associated with the command endpoint when both the set of additional names and the second set of additional names cluster with the set of names that are failed DNS lookups.

21. The computer program product as described in claim 15 wherein a machine learning clustering technique is used to determine the candidate resolved DNS clusters with the set of names that are failed DNS lookups.

* * * * *